United States Patent
Le Ludec et al.

(10) Patent No.: US 12,532,026 B2
(45) Date of Patent: Jan. 20, 2026

(54) METHOD FOR ENCODING IMAGES OF A VIDEO SEQUENCE TO BE ENCODED, DECODING METHOD, CORRESPONDING DEVICES AND SYSTEM WITH SPATIAL IMAGE SUB-SAMPLING

(71) Applicant: FONDATION B-COM, Cesson-sévigné (FR)

(72) Inventors: Benoît Le Ludec, Cesson-sévigné (FR); Patrick Duménil, Betton (FR); Franck Chi, Saint Sulpice la Forêt (FR)

(73) Assignee: FONDATION B-COM, Cesson-Sévigné (FR)

( * ) Notice: Subject to any disclaimer, the term of this patent is extended or adjusted under 35 U.S.C. 154(b) by 186 days.

(21) Appl. No.: 18/259,064

(22) PCT Filed: Dec. 17, 2021

(86) PCT No.: PCT/EP2021/086398
§ 371 (c)(1),
(2) Date: Jun. 22, 2023

(87) PCT Pub. No.: WO2022/136143
PCT Pub. Date: Jun. 30, 2022

(65) Prior Publication Data
US 2024/0056603 A1    Feb. 15, 2024

(30) Foreign Application Priority Data
Dec. 22, 2020    (FR) ........................................ 2013944

(51) Int. Cl.
*H04N 19/59*    (2014.01)
*G06T 7/11*    (2017.01)
(Continued)

(52) U.S. Cl.
CPC ................ *H04N 19/59* (2014.11); *G06T 7/11* (2017.01); *H04N 19/117* (2014.11); *H04N 19/154* (2014.11); *H04N 19/172* (2014.11)

(58) Field of Classification Search
CPC .... H04N 19/11; H04N 19/112; H04N 19/172; H04N 19/154; H04N 19/117; H04N 19/59
See application file for complete search history.

(56) References Cited

U.S. PATENT DOCUMENTS 9,066,013 B2    6/2015    Ju et al.
2016/0269733 A1*   9/2016    Tourapis .............. H04N 19/186
(Continued)

FOREIGN PATENT DOCUMENTS

JP    2018511971 A    4/2018
JP    2019509690 A    4/2019
(Continued)

OTHER PUBLICATIONS

Robert Skupin et al., "HEVC tile based streaming to head mounted displays", 2017 14th IEEE Annual Consumer Communications & Networking Conference (CCNC), IEEE, Jan. 8, 2017, pp. 613-615. (Submission Pending).

(Continued)

*Primary Examiner* — On S Mung
(74) *Attorney, Agent, or Firm* — NIXON & VANDERHYE, PC

(57) ABSTRACT

Disclosed is a method for encoding images of a video sequence that includes implementing the following steps: c) obtaining an initial configuration representative of structural characteristics of a display device and, for an image of the video sequence referred to as the input sub-sequence, d1) carrying out a first spatial sub-sampling operation on the elements of the image by using a filter oriented in a first (Continued)

direction and including a first set of values of sub-sampling factors, the latter being determined as a function of the initial configuration, then inserting the resulting image into an output sub-sequence, and e) encoding the images of the output sub-sequence.

20 Claims, 10 Drawing Sheets

(51) Int. Cl.
*H04N 19/117* (2014.01)
*H04N 19/154* (2014.01)
*H04N 19/172* (2014.01)

(56) References Cited

U.S. PATENT DOCUMENTS

| | | |
|---|---|---|
| 2017/0280126 A1 | 9/2017 | Van Der Auwera et al. |
| 2018/0146121 A1 | 5/2018 | Hensler et al. |
| 2020/0107060 A1 | 4/2020 | Khan et al. |
| 2021/0063741 A1 | 3/2021 | Riguer et al. |

FOREIGN PATENT DOCUMENTS

| | | |
|---|---|---|
| JP | 2019533325 A | 11/2019 |
| JP | 2022546683 A | 11/2022 |
| WO | 2011090790 A1 | 7/2011 |
| WO | 2016134048 A1 | 8/2016 |
| WO | 2016145243 A1 | 9/2016 |
| WO | 2018026730 A1 | 2/2018 |
| WO | 2019237027 A1 | 12/2019 |
| WO | 2020025510 A1 | 2/2020 |

OTHER PUBLICATIONS

International Search Report w/English translation and Written Opinion of the ISA for PCT/EP2021/086398, mailed Apr. 13, 2022, 12 pages.
Robert Skupin et al., "HEVC tile based streaming to head mounted displays", 2017 14th IEEE Annual Consumer Communications & Networking Conference (CCNC), IEEE, Jan. 8, 2017, pp. 613-615.
Office Action, issued in Japanese Patent Application No. 2023-538080 dated Sep. 30, 2025.

\* cited by examiner

METHOD FOR ENCODING IMAGES OF A VIDEO SEQUENCE TO BE ENCODED, DECODING METHOD, CORRESPONDING DEVICES AND SYSTEM WITH SPATIAL IMAGE SUB-SAMPLING

CROSS-REFERENCE TO RELATED APPLICATIONS

This application is the U.S. national phase of International Application No. PCT/EP2021/086398 filed Dec. 17, 2021, which designated the U.S. and claims priority to FR 2013944 filed Dec. 22, 2020, the entire contents of each of which are hereby incorporated by reference.

TECHNICAL FIELD OF THE INVENTION

The present invention relates to the technical field of video sequence encoding and decoding. More particularly, it relates to an encoding method and device, a decoding method and device, as well as the corresponding devices.

STATE OF THE ART

In order to transmit a high spatial and temporal resolution video content, it is known to implement a so-called scalable method, as described in the patent application WO2020/025510. Processing a video sequence using this method reduces the quantity of video data to be transmitted, without visible alteration of the video sequence quality in the spatial and temporal domains when the pictures are displayed.

DISCLOSURE OF THE INVENTION

In this context, according to a first aspect of the invention, a method for encoding pictures of a video sequence is proposed, each picture being formed of elements organized into rows and columns. The method comprises the implementation of the following steps
  c) obtaining an initial configuration representative of structural characteristics of a display device and, for at least one picture of a subsequence of one or more pictures of the video sequence referred to as the input subsequence,
  d1) carrying out a first spatial subsampling of at least part of the elements of the picture using a filter oriented in a first direction and comprising a first set of at least two different subsampling factor values, the first set of values being determined as a function of said initial configuration, then inserting the resulting picture into an output subsequence, and
  e) encoding (E2) the pictures of the output subsequence.

Advantageously, the method according to the first aspect of the invention makes it possible to reduce the quantity of encoded data to be transmitted, without loss of visual quality for the user who watches the video sequence. Indeed, the subsampling depends on structural characteristics (e.g., optical ones or relating to the shape of the display device) of the display device on which the user watches the video sequence. It is thus possible to adjust the subsampling to the areas of interest of the pictures for the user, with respect to the display device used.

Preferably, step d1) further comprises a second spatial subsampling of at least part of the elements of the subsampled picture using a filter oriented in a second direction and comprising a second set of at least two different subsampling factor values, the second set of values being determined as a function of said initial configuration.

The implementation of two successive subsampling operations using two filters oriented in two different directions makes it possible to generate relatively complex patterns, the pattern defining areas having values of different spatial resolutions. It is then possible to finely adjust the resolution of each area of the processed pictures according to the structural characteristics of the display device.

Preferably, a spatial subsampling is carried out using filters oriented in one of the following directions:
  horizontal,
  vertical.

The choice of these directions allows a particularly simple implementation of the solution within an encoding device, while allowing complex patterns of spatial resolutions.

Each subsampling factor value of a set of values is preferably applied respectively to at least one group of p successive elements in the direction in which the filter is oriented, p being a positive integer.

According to an embodiment, the method can further comprise an analysis step comprising an analysis of the content of at least one picture of said input subsequence, and a step of updating the subsampling factor values previously to the implementation of step d1), as a function of the result of the analysis of the content.

According to an embodiment, the method can further comprise an analysis step comprising an analysis of measurements representative of movements made by a user, the display device being a head-mounted display worn by said user (e.g. his/her head and/or eyes), and a step of updating the subsampling factor values previously to the implementation of step d1), as a function of the result of the analysis of the measurements.

According to another embodiment, the method can further comprise another analysis step comprising an analysis of the visual quality of the pictures of said output subsequence, and a step of updating the subsampling factor values previously to the implementation of step d1), if the visual quality is lower than a predetermined threshold.

According to another embodiment, the method can further comprise a preliminary step comprising the following sub-steps
  a) obtaining from said video sequence, so-called initial subsequences, and for at least one initial subsequence:
    b1) determining information representative of the content of at least one picture of the initial subsequence, and as a function of said information,
    b2) determining for the initial subsequence, a processing frequency, lower than or equal to the initial picture display frequency, as a function of the determined information, and
    b3) inserting, as a function of the determined processing frequency, all or part of the pictures of the group of pictures in a subsequence of pictures forming an input subsequence.

Preferably, the method can then further comprise an a posteriori step for the M pictures of an output subsequence, M being an integer, said a posteriori step comprising the following sub-steps
  d2) comparing the processing frequency associated with the pictures of the output subsequence with the initial picture display frequency, and
  if the processing frequency is lower than the initial frequency, spatially dividing each of the M pictures of the output subsequence into N subpictures, N being an integer whose value depends on the ratio between the processing frequency and the initial frequency, the encoding step e) corresponding to the encoding of the M*N subpictures of the output subsequence, otherwise the encoding step e) corresponds to the encoding of said M pictures of the output subsequence.

According to another embodiment, the method can further comprise the following steps for each output subsequence obtaining information representative of at least one of the elements of the following list:
subsampling factor values,
measurements representative of movements made by a user, the display device being a head-mounted display worn by said user,
structural characteristics of the display device,
processing frequency, and
encoding of said information.

According to a second aspect of the invention, a method for decoding data corresponding to pictures of a video sequence is proposed, each picture being formed of elements organized into rows and columns, the pictures of the video sequence being grouped into subsequences of one or more pictures referred to as the output subsequences. The method comprises the implementation of the following steps c1) obtaining an initial configuration representative of structural characteristics of a display device and, for at least one picture of an output subsequence;

d11) carrying out a first spatial oversampling of at least part of the elements of the picture using a filter oriented in a first direction and comprising a first set of at least two different oversampling factor values, the first set of values being determined as a function of said initial configuration, then inserting the resulting picture into a subsequence to be decoded, and e1) decoding the pictures of the subsequence to be decoded.

Preferably, step d11) can further comprise a second spatial oversampling of at least part of the elements of the oversampled picture using a filter oriented in a second direction and comprising a second set of at least two different oversampling factor values, the second set of values being determined as a function of said initial configuration.

According to a third aspect of the invention, a device for encoding pictures of a video sequence is proposed, each picture being formed of elements organized into rows and columns. The device is configured to implement the following steps c) obtaining an initial configuration representative of structural characteristics of a display device and, for at least one picture of a subsequence of one or more pictures of the video sequence referred to as the input subsequence, d1) carrying out a first spatial subsampling of at least part of the elements of the picture using a filter oriented in a first direction and comprising a first set of at least two different subsampling factor values, the first set of values being determined as a function of said initial configuration, then inserting the resulting picture into an output subsequence, and e) encoding the pictures of the output subsequence.

According to a fourth aspect of the invention, a device for decoding data corresponding to pictures of a video sequence is proposed, each picture being formed of elements organized into rows and columns, the pictures of the video sequence being grouped into subsequences of one or more pictures referred to as the output subsequences. The device is configured to implement the following steps c1) obtaining an initial configuration representative of structural characteristics of a display device and, for at least one picture of an output subsequence;

d11) carrying out a first spatial oversampling of at least part of the elements of the picture using a filter oriented in a first direction and comprising a first set of at least two different oversampling factor values, the first set of values being determined as a function of said initial configuration, then inserting the resulting picture into a subsequence to be decoded, and e1) decoding pictures of the subsequence to be decoded.

DETAILED DESCRIPTION OF THE INVENTION

Moreover, various other features of the invention will be apparent from the appended description made with reference to the drawings that illustrate non-limiting embodiments of the invention, and wherein.

Figure 1:
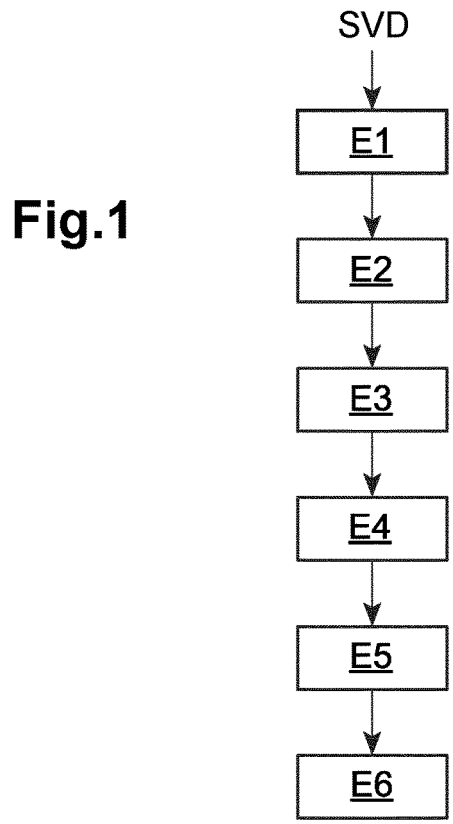
FIG. 1 shows an embodiment of a method according to the first aspect of the invention.
Figure 4:
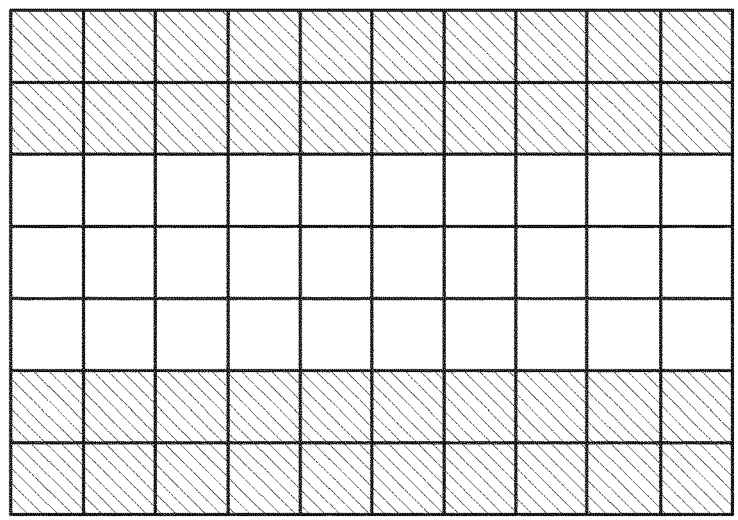
Figure 5:
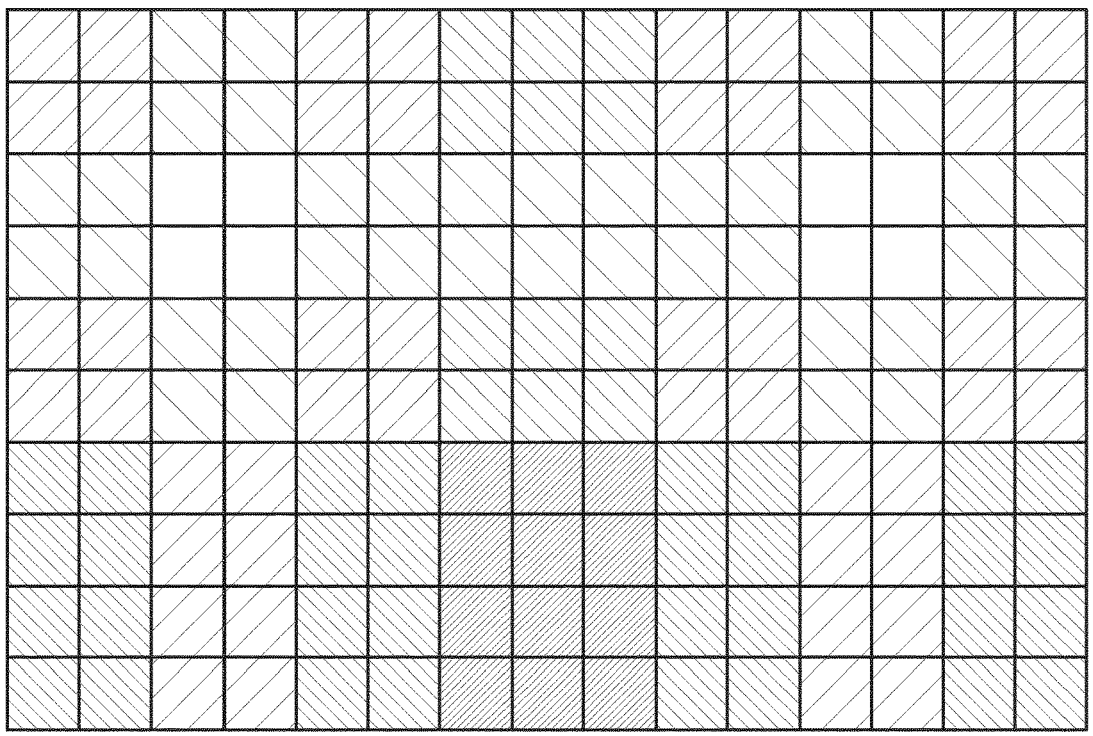
Figure 6:
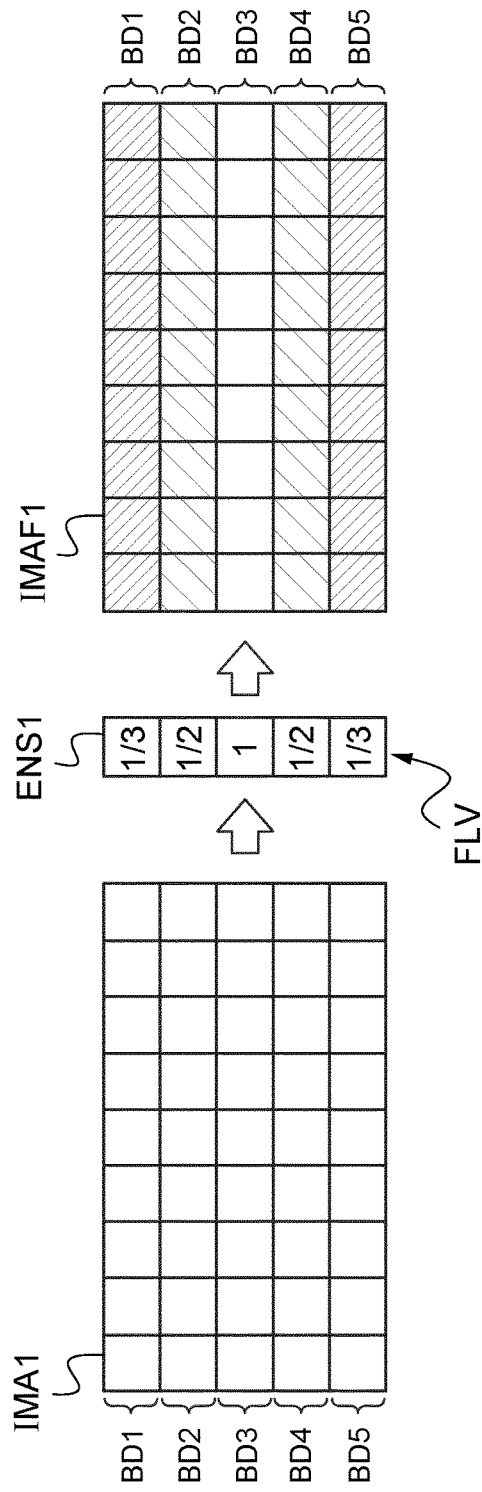
Figure 7:
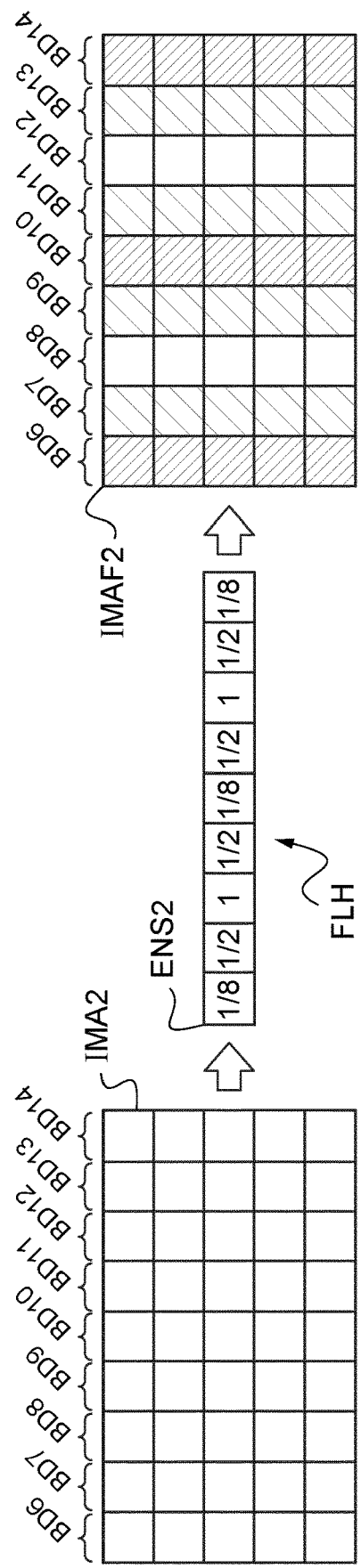
Figure 8:
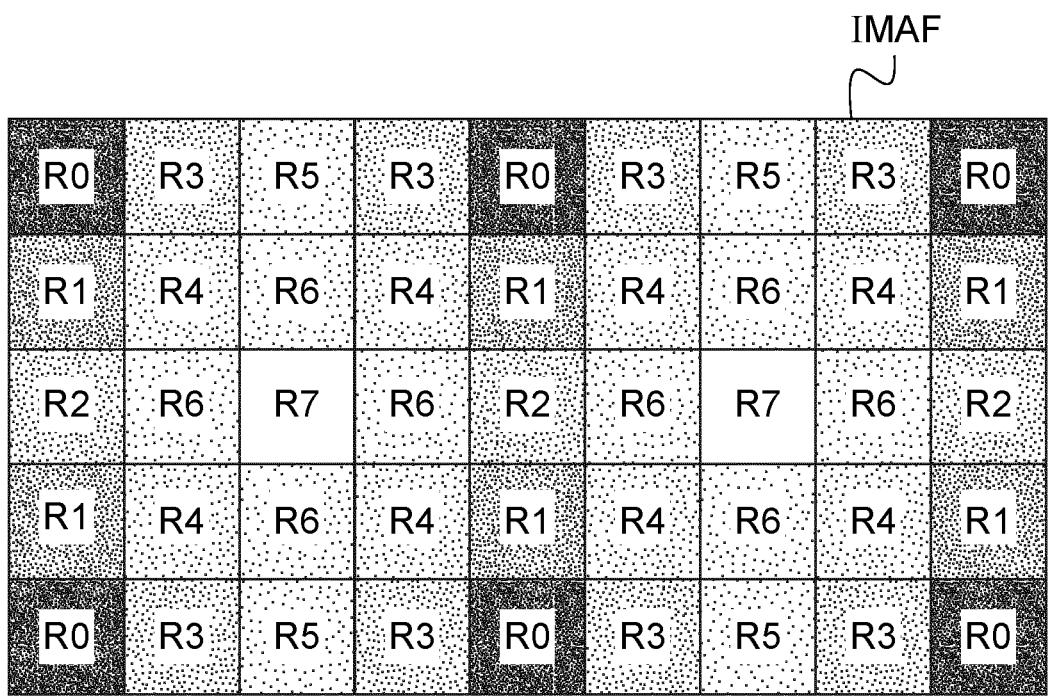
Figure 9:
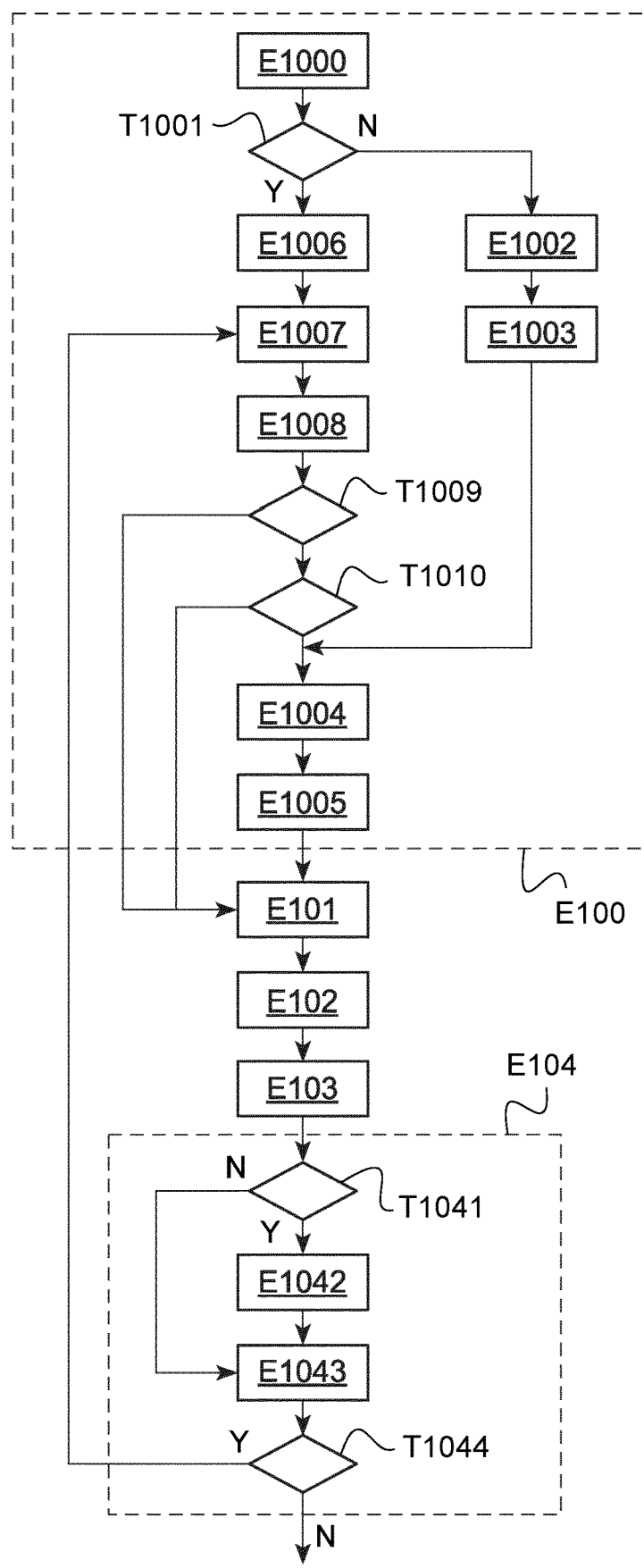
Figure 10:
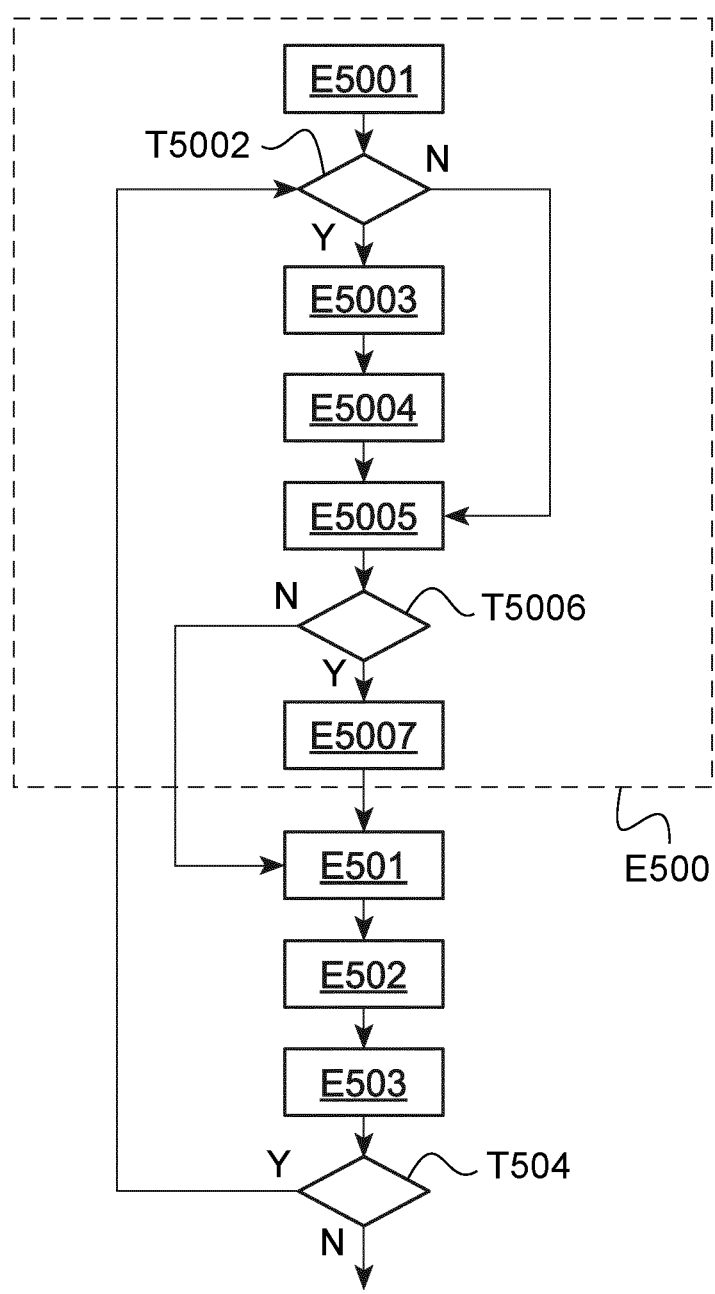
Figure 11:
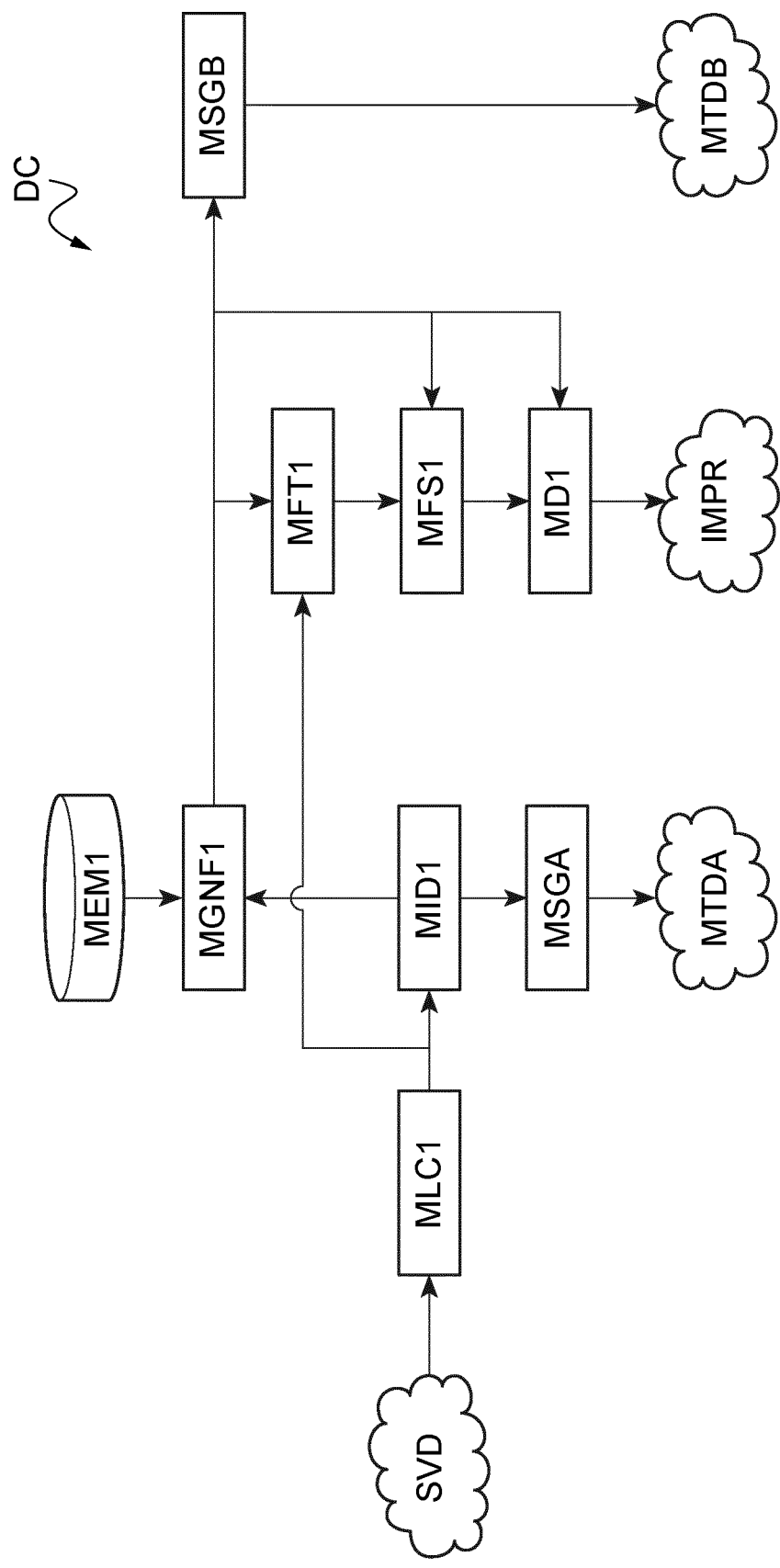
Figure 12:
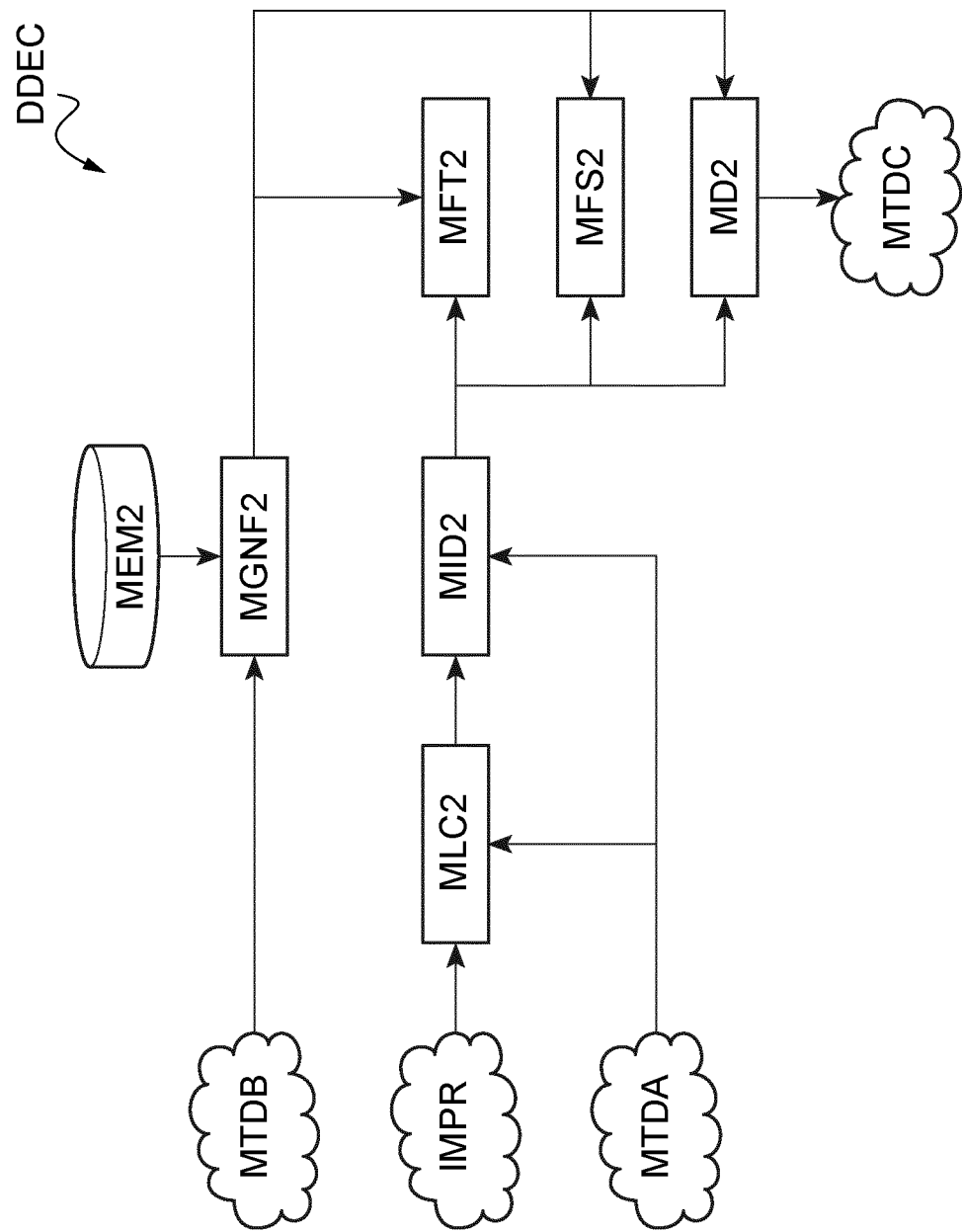
Figure 13:
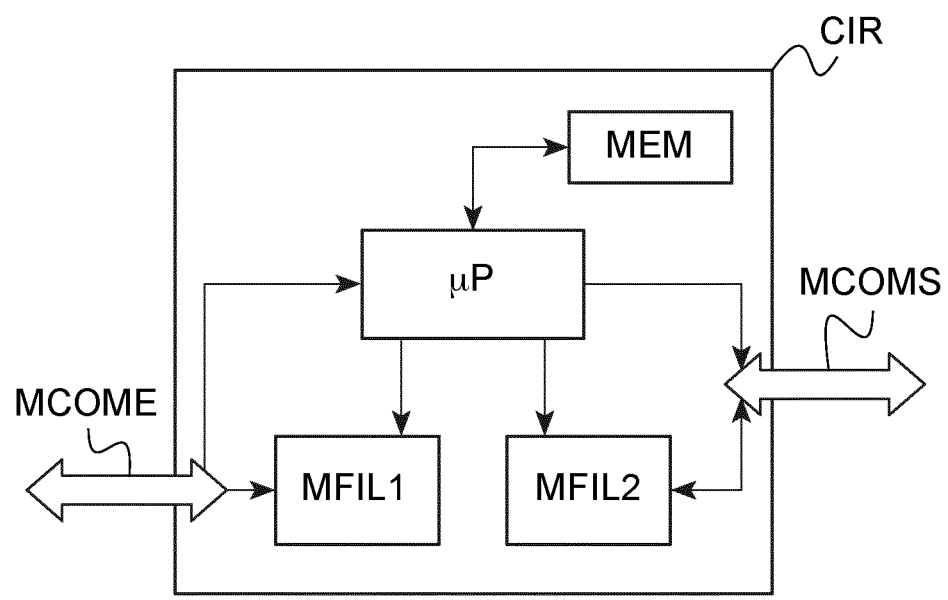

FIG. 4 schematically shows a pattern obtained according to an embodiment of the method according to the invention;

FIG. 5 schematically shows another pattern obtained according to another embodiment of the method according to the invention;

FIG. 6 shows in detail an embodiment of a spatial subsampling step according to the invention;

FIG. 7 shows in detail another embodiment of a spatial subsampling step according to the invention;

FIG. 8 schematically shows patterns obtained at the end of the successive applications of the embodiments illustrated in FIGS. 6 and 7;

FIG. 9 illustrates more precisely certain steps of the embodiment shown in FIG. 1;

FIG. 10 shows an embodiment of a method according to the second aspect of the invention;

FIG. 11 shows an embodiment of a device according to the third aspect of the invention;

FIG. 12 shows an embodiment of a device according to the fourth aspect of the invention; and FIG. 13 shows a possible implementation of the devices according to the third or the fourth aspect of the invention.

FIG. 1 shows an embodiment of a method according to the invention. Source video data SVD are provided as an input of a preprocessing step E1, e.g. in a UHD ("Ultra-High Definition") video format. Each source video is processed on a "Group of Pictures" (GOP) basis. A group of pictures forms an input subsequence. This step E1, described in more detail hereinafter, allows spatial processing and optionally temporal processing to be applied to the video data. The spatial and possibly temporal frequency of the pixels forming the pictures of the video sequence SVD is reduced as a result of the preprocessing. The format of the video is then modified. Possibly, metadata relating to the preprocessing are generated as explained in the following of the description.

The processed video data are encoded during a step E2, then transmitted, step E3, to display means. Previously to the display, the transmitted encoded video data are decoded, step E4. They are then subjected to a post-processing E5 that is function of the preprocessing E3 carried out before the encoding. Possibly, the post-processing E5 depends on the metadata generated during the preprocessing step E2. The post-processed video data are finally displayed using the display means at step E6.

Steps E1, E2 and E3 are implemented by a transmitter device, whereas steps E4, E5 and E6 are implemented by a receiver device comprising the display means.

Figure 2:
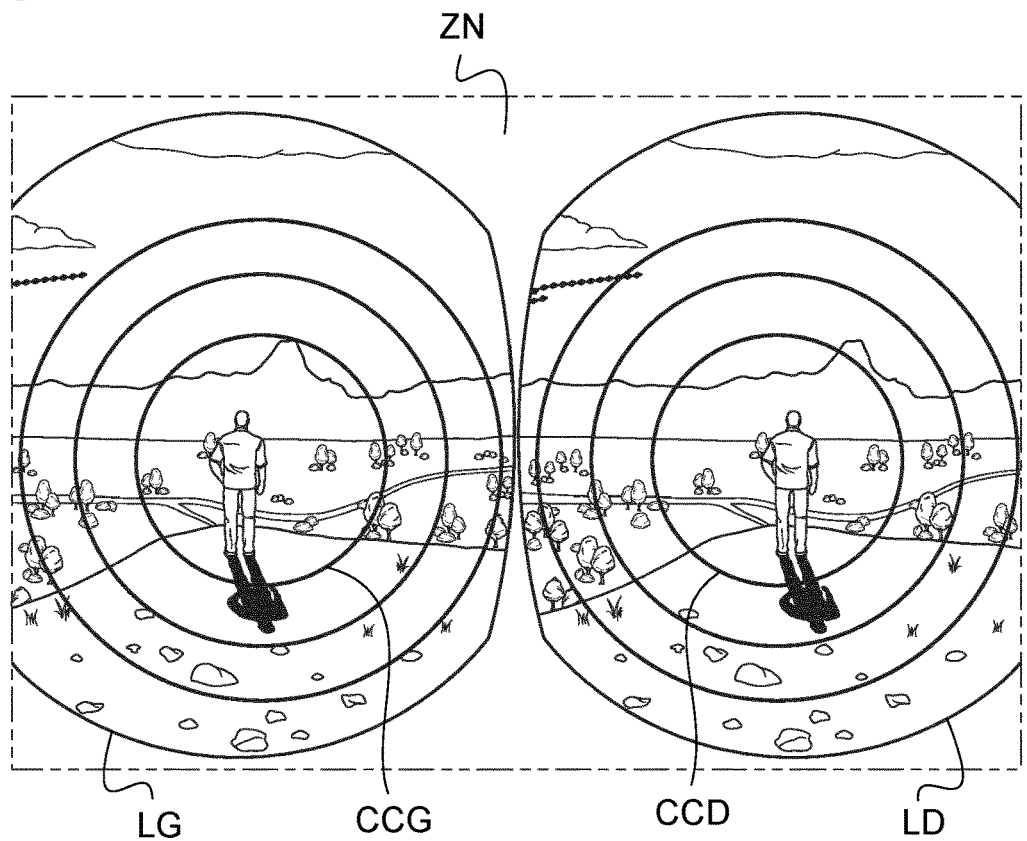
FIG. 2 illustrates the optical characteristics of a head-mounted display used to display a video sequence.

The display means may comprise a screen of variable dimensions, a head-mounted display or also a simple display surface, this list being not exhaustive. These display means have their own display configurations. A display configuration can be defined by the structural characteristics of the display device, such as its dimensions or also the parameters of its optical components. By way of example, FIG. 2 schematically shows the optical characteristics of the lenses, respectively left LG and right LD, of a head-mounted display. Conventionally, each lens LG, LD allowing a binocular vision has an optimum spatial resolution inside a central circle CCG, CCD. When the head-mounted display is worn by a user, this central circle faces the eye's fovea, respectively left or right. The fovea is the retina area where the vision of details is the most precise. Then, when going away from the central circle, the spatial resolution of the displayed picture gradually decreases in steps, according to concentric circles of increasing radius. Finally, a black area ZN surrounds the circular display areas of the video.

Figure 3:
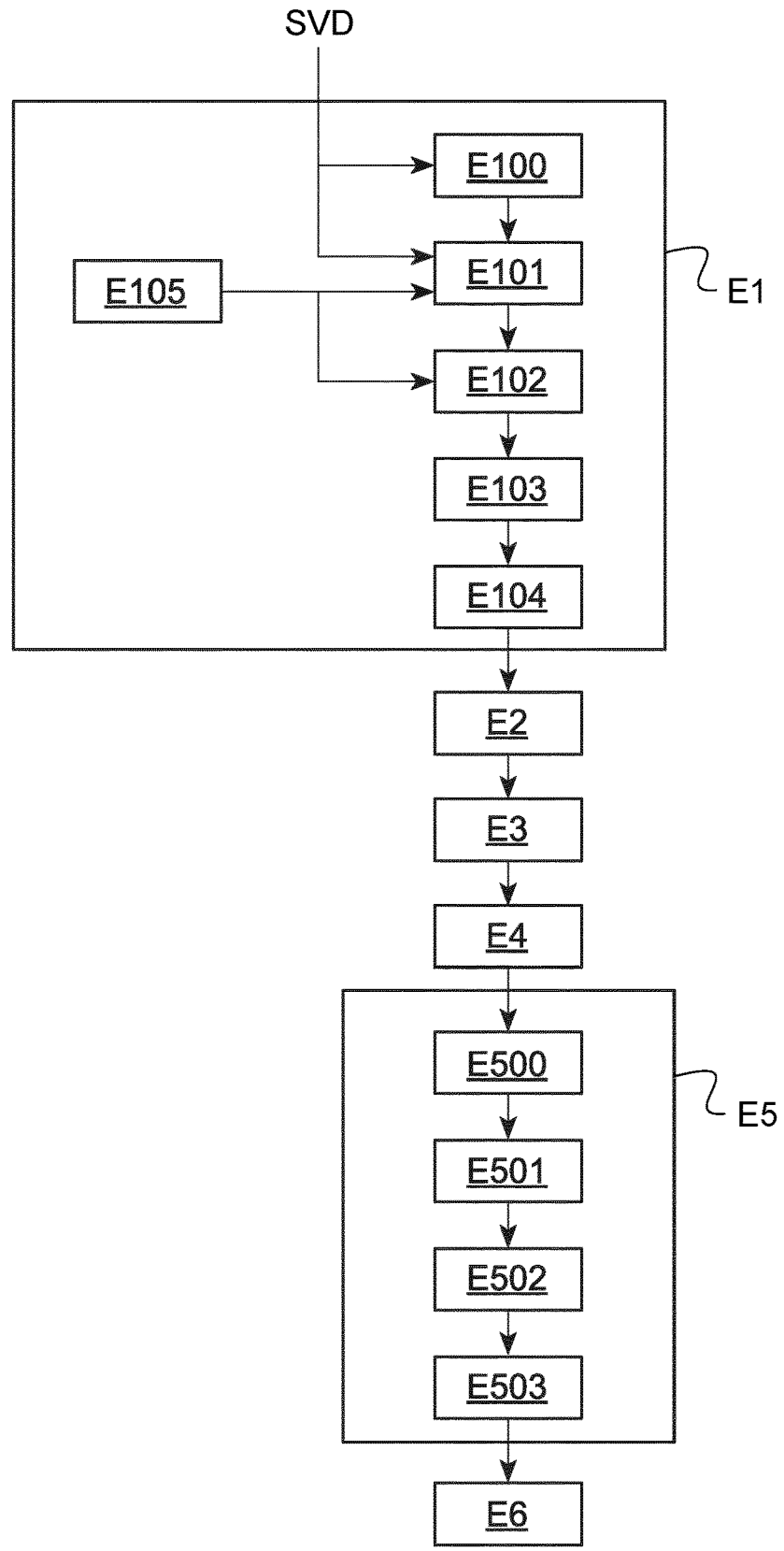
FIG. 3 illustrates more precisely certain steps of the embodiment shown in FIG. 1.

FIG. 3 illustrates in more detail steps E1 and E5 of FIG. 1. The preprocessing step E1 comprises a first sub-step E100 of initial configuration. This sub-step allows obtaining a set of spatial, and optionally temporal, filters, to be applied to a group of pictures of the source video according to a filtering pattern resulting from the configuration. The initial configuration can be set as default (e.g., stored) or updated for each input subsequence in such a way as to take into account contextual variations during use. An initial configuration depends on one or more criteria combined together, these criteria comprising the display configuration defined hereinabove. It may further depend on additional criteria, e.g. relating to the transmission chain of the video between the transmitter and the receiver, or also to instructions given by a user, these instructions relating to a quantity of data that is possible to transmit, an allowed latency threshold, or a tolerable level of complexity.

Sub-step E100 makes it possible to provide a spatial, and possibly temporal, frequency value that is acceptable a priori so that the content is rendered on the display device without significant loss of quality. A spatial frequency value is associated with a partition of a picture (the picture comprising at least two partitions). A temporal frequency value (corresponding to a picture transmission frequency or "transmitted picture frequency") corresponds to the transmitted picture frequency within a group of pictures of the source video.

As a function of the initial configuration obtained, the two following sub-steps E101 and E102 are implemented, step E101 being optional. If the initial configuration involves a temporal filtering, step E101 is implemented. It comprises, for a group of pictures, a modification of the input subsequence of pictures, only part of the pictures being kept. For the sake of simplicity, unless otherwise stated, it is considered in the following description that a spatial filtering (E102) and a temporal filtering (E102) are implemented. The input subsequences of the source video are thus subjected to a combination of processing operations comprising a spatial and temporal subsampling for at least part of the pictures.

For each group of processed pictures, sub-step E101 provides a subsequence of pictures whose temporal frequency depends on the initial configuration. The temporal frequency can be identical to the original temporal frequency of the group of pictures of the input subsequence. The subsequence of pictures at the output of sub-step E101 is then identical to the input subsequence of pictures. Conversely, the temporal frequency resulting from the initial configuration can correspond to said original frequency divided by N (N being an integer higher than or equal to 2). One picture out of N of the input stream is then suppressed. The subsequence of pictures at the output of sub-step E101 has thus a temporal frequency divided by N.

In an embodiment, the sub-step E101 can receive information resulting from an analysis (E105) of the measurements of movements made by the display device and/or by a user (or his/her eyes) in the case where the display device would be a head-mounted display worn by this user. This information representative of the measurements for movement estimation is then used to adapt the temporal frequency in order to prevent the "motion sickness" symptoms experienced by the head-mounted display wearer, which could be generated by approaches of the state of the art, i.e. non dynamic as regards the temporal frequency. Preferably, if the input subsequence has significant movements, in this case the temporal frequency will be kept at its maximum, and the spatial resolution decrease, implemented in sub-step E102, will be favored. On the contrary, if the input subsequence has little movements, the temporal frequency decrease will be favored, and the spatial resolution, implemented in sub-step E102, will be little or not reduced.

A spatial filtering (E102) is then applied to the pictures of at least one group of pictures of the input subsequence, as a function of the initial configuration. The spatial filtering is carried out using at least one spatial subsampling of the elements of at least one row or at least one column of the picture. This spatial subsampling depends on a set of factors also called subsampling pitch defined by the initial configuration. One element represents one pixel of the picture or the component of this pixel for one of the color components of the picture.

As an alternative and as considered in the following of the description, the spatial filtering is carried out according to two successive subsampling operations, using filters oriented in two different directions, respectively, horizontal (horizontal filters) and vertical (vertical filters), regardless of the order. Thus, the columns then the rows of the picture are successively subsampled. As an alternative, it is possible to alternate the subsampling of one row then the subsampling of one column, or vice versa.

Decomposing the spatial filtering into two subsampling operations using, for each of the subsampling operations, filters oriented in two different directions, makes it possible to obtain within a picture, areas or partitions of different resolutions, according to the sampling factors implemented by the filters. The implementation of an electronic processing in a programmable circuit adapted to carry out subsampling operations using vertical or horizontal filters is simple while requiring little memory and limiting the processing latency. By finally adapting the values taken by the sampling factors, it is possible to obtain very accurate patterns, each having their own spatial resolution, that depends on the areas of interest of the picture. For example, the closer the picture area is displayed with respect to the eye's fovea, the higher the spatial resolution. In other words, a pattern makes is possible to apply different subsampling factors as a function of the different areas of the picture, wherein these areas can be defined in the initial configuration using their spatial coordinates.

FIGS. 4 and 5 respectively show two pictures subsampled according to two different configurations of the subsampling pitches or factors and the pixel sub-sets concerned by each subsampling pitch value.

Each square corresponds to a group of elements of a picture. The pattern (horizontal strips) of FIG. 4 results from a single subsampling using a set of different sampling pitch values applied using vertical filters. The pattern of FIG. 5 results from the application of a first subsampling using a first set of different sampling pitch values applied using vertical filters, followed with a second subsampling using a second set of different sampling pitch values applied using horizontal filters. The order of application of the first and second subsampling operations can be reversed. Rectangular patterns are obtained as a function of the values of the sampling pitches applied, and of the number of pixels concerned by each sampling pitch. The lighter the shade of a rectangle in the pattern, the higher the spatial resolution of the corresponding area of the picture. Conversely, the darker the shade, the more reduced the spatial resolution of the corresponding area of the picture.

FIGS. 6 and 7 explain the first and second spatial subsampling operations, respectively.

FIG. 6 schematically shows a picture or picture part IMA1 to be processed. The rows of the picture are organized into L successive horizontal strips BD1, BD2, BD3, BD4 and BD5. More generally, L is a positive integer. For example, each horizontal strip comprises a number of rows that depends on the configuration of the filter(s) used to carry out the spatial subsampling (e.g. 8 lines).

A first set of subsampling pitches ENS1 is then applied to the picture IMA1 using a vertical filter FLV. This first set ENS1 comprises in this example the following subsampling factor values: $\{1/3, 1/2, 1, 1/2, 1/3\}$. Therefore, for the rows belonging to the first BD1 and the fifth BD5 horizontal strip, only one pixel out of three successive pixels in the vertical direction is kept. For the rows belonging to the second BD2 and the fourth BD4 horizontal strip, only one pixel out of two successive pixels in the vertical direction is kept. Finally, for the third horizontal strip BD3, all the pixels are kept.

The value of each pixel kept at the end of the subsampling operation can be interpolated using the known bilinear or bi-cubic algorithm methods or also thanks to the Lanczos method, which is well known by the person skilled in the art. As an alternative, the value of the pixel that is kept can be equal to its original value.

Once the set of horizontal strips has been subsampled, the resulting subsampled picture IMAF1 is obtained, such that the darker the shown strip (the hatching is the densest), the higher the number of remaining pixels.

FIG. 7 schematically shows a picture or picture part IMA2 to be processed. The columns of the picture are organized into M successive vertical strips BD6, BD7, BD8, BD9, BD10, BD11, BD12, BD13 and BD14. More generally, M is a positive integer. For example, each vertical strip comprises a number of columns that depends on the configuration of the filter used to carry out the spatial subsampling (e.g. 8 columns).

A second set of subsampling pitches ENS2 is then applied to the picture IMA2 using a horizontal filter FLH. This second set ENS2 comprises in this example the following subsampling factor values: $\{1/8, 1/2, 1, 1/2, 1/8, 1/2, 1, 1/2, 1/8\}$. Thus, for the columns belonging to the first BD6, the fifth BD10 and the last BD14 vertical strip, only one pixel out of eight successive pixels is kept in the horizontal direction. For the columns belonging to the second BD7, the fourth BD9, the sixth BD11 and the eighth BD13 vertical strip, only one pixel out of two successive pixels is kept in the horizontal direction. Finally, for the third BD8 and the seventh BD12 vertical strip, all the pixels are kept in the horizontal direction.

In the same way as for the subsampling described in the previous figure, the value of each pixel kept at the end of the subsampling operation can be interpolated using the known bilinear or bi-cubic algorithm methods or also thanks to the Lanczos method, which is well known by the person skilled in the art. As an alternative, the value of the pixel that is kept can be equal to its original value.

Once the subsampling has been carried out, the resulting subsampled picture IMAF2 is obtained, such that the darker the shown strip (the hatching is the densest), the higher the number of remaining pixels.

The first and the second subsampling operations can be applied successively, in any order. If the subsampling of the horizontal strips is applied first, the output picture IMA1F then corresponds to the picture to be subsampled IMA2 of the second subsampling of the vertical strips.

FIG. 8 schematically illustrates a pattern translating a non-uniform resolution of the entire twice-sampled picture, this pattern being drawn at the end of the successive application of the two spatial subsampling operations illustrated in FIGS. 6 and 7.

The spatial resolution of each part or tile of the twice subsampled picture IMAF depends on the subsampling factor values applied to the strips including the considered tile. Finally, 8 different values of uniform spatial resolution Ri coexist within the picture IMAF, such that $R0<R1<R2<R3<R4<R5<R6<R7$. The double subsampling in two different directions makes it possible to obtain a complex pattern of spatial resolution making it possible to preserve a maximum resolution at certain places of the picture when the spatial resolution is equal to R7 (the lightest areas). The controlled reduction of the spatial resolution at certain places of the picture moreover allows reducing the quantity of data that will be transmitted.

For example, the pattern of FIG. 8 can be implemented when the display configuration is associated with a head-mounted display, as that shown in FIG. 2. The maximum spatial resolution R7 then corresponds to the areas located in front of the central circles.

According to an embodiment, the higher the temporal frequency value of a group of pictures, the lower the spatial resolution values. For example, the preprocessing means implementing the preprocessing step can store a table of correspondence between temporal frequency values implemented in step E101 and sets of subsampling pitches to be applied in step E102. The correspondence table may store an intermediate overall resolution value of the picture once the latter subsampled (e.g. divided by a positive integer P with respect to the original picture). To an intermediate overall resolution value of the picture corresponds one or more sets of subsampling pitches, so that the complete picture is on average subsampled by the intermediate overall resolution value.

For example, the initial configuration can comprise as an instruction a quantity of data that can be transmitted, this instruction being expressed as follows:
an overall reduction rate RED of the initial quantity of data—RED can be expressed as integer or decimal positive values;
an allowed temporal subsampling rate TEMP (wherein this rate can take positive integer values for a less complex processing, and this constraint can be lifted if the technical context allows a more complex processing).

The spatial subsampling rate SPAT is then obtained from the following formula: SPAT=RED/TEMP. The latter can take positive values, integer or not.

For example, if the overall reduction rate is equal to RED=4, then:
if TEMP=4, then SPAT=1;
if TEMP=3, then SPAT=4/3;
if TEMP=2, then SPAT=2;
if TEMP=1, then SPAT=4.

The set(s) of subsampling pitches are obtained using a look-up table, defined for example by the initial configuration as a function of the value taken by SPAT.

It is referred again to FIG. 3. Optionally, a sub-step of picture dividing E103 is implemented for the pictures of a group of pictures. This step precedes the encoding step E2. It aims at decomposing each picture of the group of pictures into k subpictures (k being a positive integer). For example, if k=2, each picture is divided into two halves. More generally, if the temporal frequency of the group of pictures at the output of sub-step E101 is equal to the original frequency divided by N, each picture is then divided into N subpictures in sub-step E103. When all the pictures of the input subsequence have been processed, they are issued (E104) to be processed.

Thus, at the output of sub-step E104, the group of processed pictures forms an output subsequence to be encoded, this output subsequence having rather a low spatial resolution (the value being equal on average to the intermediate overall resolution value) and a temporal frequency equal to the original temporal frequency due to the decomposition of the pictures into subpictures during the sub-step E103. The original temporal frequency conservation makes the preprocessing compatible with an encoding implemented using an encoder operating at a fixed input frequency.

The present invention could be combined with the proposal of patent application WO2020/025510 in the names of the applicants. In which case, only sub-steps E101 and E103 can also be implemented. In this case, the method resulting from the combination would allow dividing the quantity of data by 2 (if N=2) with no change in the resolution and no subjective loss of visual quality either. The method resulting from said combination (and the corresponding device) thus offers three alternatives making it possible to reduce the quantity of data to be transmitted with, according to the alternative, a reduction factor varying from 2 to 4 in the case where N=2. Either only the temporal frequency is reduced, or only the spatial resolution is degraded, or the spatial resolution and the temporal frequency are both decreased.

The encoding of step E2 can thus be carried out using a low latency standard codec operating at fixed resolution (the lowest spatial resolution, e.g. R0 in FIG. 8) and at high temporal frequency (original temporal frequency). An electronic circuit implementing row and/or column subsampling operations according to the invention can be miniaturized. Being moreover compatible with a standard codec, it is then possible to integrate it into a head-mounted display without noticeable additional weight, e.g. a head-mounted display VIVE™ of the HTC company.

Each encoded output subsequence is then transmitted (step E3) via, for example, a wireless transmission channel (non-limiting example). For example, the output subsequences can be intended for several users within the framework of a virtual reality application involving several head-mounted display wearers. The wireless transmission channel is then multi-users. For example, the WiGig 60 GHz Wi-Fi wireless network protocol can be used for the transmission (the bandwidth is of the order of 7 Gbps). As an alternative, the Wi-Fi 5 protocol offering a bandwidth of 600 Mbps can be used.

Each output subsequence is received and decoded (step E4). The decoding implemented depends on of the encoding implemented at step E2. Then, the post-processing step E5 is carried out. This step comprises a sub-step E500 of obtaining a post-processing configuration. This sub-step is described in more detail hereinafter with reference to FIG. 10.

Then, step E5 comprises a picture reconstruction sub-step E501, in the case where the picture dividing sub-step E103 has been implemented during the preprocessing E1. If each picture has been divided into 2 halves during step E103, each new reconstructed picture is obtained by suitably juxtaposing two successive pictures of the received and decoded output subsequence. Once the pictures reconstructed, an oversampling sub-step E502 allows increasing the spatial resolution of the reconstructed pictures. The oversampling is carried out in the same directions as the subsampling, and using sets of oversampling pitches having inverse values with respect to the oversampling pitch values. The value of each new pixel linked to the over-sampling can be extrapolated for example using the known bilinear or bi-cubic algorithm methods or also thanks to the Lanczos method which is well known by the person skilled in the art. At the end of the over-sampling sub-step E502, the spatial resolution of the reconstructed pictures is equal to the spatial resolution of the pictures of the input subsequence before the subsampling step E102. Finally, if a sub-step E101 of temporal frequency reduction is carried out as a preprocessing, the post-processing comprises a sub-step E503 of restoring the original frequency of the input subsequence. For that purpose, if the temporal frequency of the output subsequence corresponds to the temporal frequency of the input subsequence divided by N, each picture from the sub-step E502 is then repeated N times, in such a way as to restore the temporal frequency of the input subsequence. Thus, a subsequence of decoded and post-processed pictures having the maximum spatial resolution and temporal frequency, equal to those of the input subsequence, is provided as an input to the display step E6.

According to a first embodiment, the temporal and spatial filters are predefined and stored both for the preprocessing and the post-processing. A look-up table then associates a configuration to a selection of temporal and/or spatial filters. According to a second embodiment, the identification of the spatial and/or temporal filters at the time of the preprocessing is coupled to the generation and sending of dedicated metadata, transmitted to the device implementing the post-processing. FIG. 9 illustrates the second embodiment. Sub-step E100 is itself decomposed into several sub-steps. A first one of these sub-steps E1000 includes obtaining the initial configuration and the parameters associated with this initial configuration, for example: a configuration relating to an optic of a head-mounted display. If the filters liable to be associated with the initial configuration are not predefined (e.g. previously stored) T1001, in this case (arrow "N"), the group of pictures to be processed is read E1002 then analyzed E1003. The analysis can include an analysis of the content of the pictures (or of a reference picture among the group of pictures) with e.g. edge detection, motion estimation e.g. by means of measurements made by motion sensors, determination of a histogram of pixel values. This analysis can be implemented using an algorithm based on a preliminary learning ("machine learning"). The analysis step E1003 can also comprise an analysis of external information such as the movement of the head-mounted display worn by the user or the analysis of information complementary to the pictures, such as depth information. At the end of the analysis, the optimum filters to carry out the filtering steps are identified and selected (E1004) e.g. using a table of correspondence between a result of content analysis and temporal and/or spatial filters. An optional check (E1005) of the setting of the selected filters with respect to a predetermined minimum visually acceptable quality can be implemented. If this minimum quality criterion is not satisfied, an update of the temporal and/or spatial filters can be implemented.

If filters liable to be associated with this configuration are predefined T1001 (arrow "Y"), these latter are then generated (E1006). Then the pictures of the group of pictures to be processed are read (E1007) and their content is analyzed (E1008). As a function of the analysis result, a test T1009 is implemented to check if a filter parameter update is allowed. If this is not the case (arrow "N"), the filtering operations E101, E102 and E103 are then implemented with the generated filters. If an update is allowed (arrow "Y"), a test T1010 is implemented to check whether or not the quality of the pictures that would result from a filtering with the selected filters (e.g. with respect to a predetermined minimum visually acceptable quality) is sufficient. If the quality is not sufficient (arrow "Y"), optimum filters with respect to the minimum acceptable visual quality, are identified and selected (E1004) e.g. using the table of correspondence between a result of content analysis and temporal and/or spatial filters. The optional check E1005 can be implemented again. If the quality is not sufficient (T1010, arrow "N"), the filtering operations E101, E102 and E103 are then implemented with the generated filters.

According to another alternative not shown, the sub sub-steps E1004, E1005, E1007 and E1008 as well as the tests T1009 and T1010 are not implemented. The generated filters (E1006) are directly used for the filtering operations E101, E102 and E103.

In an embodiment, sub-step E104 can comprise the making of a test T1041 to check whether or not the sending of metadata is allowed. If this is not the case (arrow "N"), the output subsequence to be encoded is directly transmitted for encoding (step E1043). If the sending of metadata is allowed (arrow "Y"), metadata obtained during sub-step E100 can be transmitted directly via Ethernet or any other means, such as the picture-auxiliary data (E1042) for the making, on the one hand, of one or more filtering sub-steps E101, E102, E103, and on the other hand, to the device implementing the post-processing, wherein the metadata can be synchronized or not with the pictures to which they relate. In this latter case, the metadata are transmitted via channels auxiliary to the transmission protocol used for the video, e.g. MJPEG "Motion Joint Photographic Experts Group"). The metadata may represent the selected filters and their parameters (e.g. using an identifier designating a filter from a predetermined list), or parameters making it possible to modify or configure predefined filters or also parameters fully describing the filters using a list of properties making it possible to generate these filters.

The exchange of metadata between the transmitter and the receiver is optional. It may be omitted in particular in the case where, during the post-processing E5, the configuration can be obtained directly e.g. from the video format of the output subsequences.

Finally, a test T1044 checks whether a new input subsequence is available. If this is the case (arrow "Y"), a new input subsequence is read E1007. Otherwise (arrow "N"), the encoding step E2 is implemented.

FIG. 10 illustrates an embodiment of the post-processing E5. The sub-step E500 previously comprises a reading of an initial configuration (E5001) stored, for example, in a memory. This initial configuration can for example correspond to a head-mounted display. A test T5002 checks if this initial configuration allows obtaining suitable filters for each output subsequence or if the filters corresponding to the obtained configuration are valid for a set of output subsequences. If the filters can be updated for each output subsequence (arrow "Y"), a configuration of the spatial and/or temporal filters is obtained (E5003), e.g. two successive spatial subsampling operations, in a vertical direction, then horizontal direction. The corresponding filters are then generated (E5004). Then, the output subsequence to be post-processed is read (E5005). If the filters cannot be updated for each output subsequence (arrow "N"), the post-processing method passes directly to the step of reading the output subsequence to be post-processed (E5005).

Then the post-processing comprises checking whether or not metadata corresponding to the considered output subsequence have been received (T5006). If metadata have been received (arrow "Y"), the filters obtained are parameterized (sampling pitch, temporal filtering frequency . . . ) during a step E5007. The different filtering operations E501, E502 and E503 are then applied to the output subsequence. If a new output subsequence is available for the post-processing (arrow "Y" of a test T504), the method is reiterated. Otherwise, the post-processing is stopped (arrow "N").

FIG. 11 schematically illustrates an embodiment of pre-processing means integrated into an encoding device DC according to the invention. The device comprises reading means MLC1 adapted to read pictures from a source video SVD, per group of pictures. The read pictures are transmitted to means for identifying an optimum preprocessing MID1. Signaling means MSGA are suitable to generate metadata MTDA describing the optimum preprocessing or comprising an identifier of this optimum preprocessing if the metadata describing it are not transmitted to the post-processing device. Generation means MGNF1 are adapted to generate filters parameterized according to the preprocessing identified by the means MID1 and as a function of an initial configuration stored in a memory MEM. In this embodiment, the device DPRT comprises means adapted to generate metadata MTDB describing the filtering parameters of the generated filters.

The preprocessing means also comprise means for temporal filtering MFT1, for spatial subsampling MFS1 and picture decomposition MD1, adapted to filter the pictures of the source video SVD as a function of the filters generated by the means MGNF. The preprocessed pictures IMPR form output subsequences transmitted with the metadata MTDA and MTDB to a display device coupled to a decoder and a post-processing device.

FIG. 12 schematically illustrates an embodiment of post-processing means belonging to a decoding device DDEC according to the invention. Reading means MLC2 are configured to read the preprocessed pictures IMPR of the successive output subsequences. These means MLC2 can implement the reading of the pictures e.g. using the preprocessing identifier MTDA transmitted simultaneously to the preprocessed pictures in order to match each read picture with the metadata descriptive of the preprocessing to be applied, e.g. stored in an annex memory as a list, the annex memory being not shown for the sake of simplification. Each preprocessing is identifiable thanks to this identifier. For example, the list can vary as a function of a result provided by means (not shown) for analyzing scenes present in the pictures. Then, identification means MID2 are adapted to determine the post-processing filtering operations to be applied to the pictures of the output subsequences, using the above-mentioned identifier MTDA. The identification means MID2 are adapted to select and parameterize the filters for the implementation of the identified post-processing. Generation means MGNF2 are configured to generate filters suitable for post-processing using the metadata MTDB transmitted simultaneously to the preprocessed pictures. The generation means MGNF2 are coupled to a memory MEM2, adapted to store a configuration as described hereinabove.

The post-processing means further comprise means for temporal filtering MFT2, for spatial over-sampling MFS2 and picture reconstruction MD2, adapted to filter the pictures read by the reading means MLC2 as a function of the post-processing identified by the means MID2 and the parameters generated by the means MGNF2. The pictures reconstructed to the format of the source video MTDC are provided as an output.

FIG. 13 schematically shows an electronic circuit CIR adapted to implement a preprocessing or post-processing method as described with reference to FIGS. 3, 9 and 10. The circuit comprises a microprocessor µP configured to drive in particular the temporal filtering operations implemented by the first spatial filtering means MFIL1, the spatial sub- or oversampling operations and the picture decompositions or reconstructions implemented by the second temporal filtering means MFIL2. Moreover, the microprocessor µP is adapted to generate or process (in post-processing) the above-mentioned processing metadata. The microprocessor µP is also coupled to a memory MEM adapted to store initial configurations as well as, as the case may be, the above-mentioned look-up tables. The microprocessor µP and the spatial MFIL1 and temporal MFIL2 filtering means are coupled to input MCOME and output CMOMS communication means, respectively, able to exchange processed data or data to be processed with another device such as an encoder or a decoder, for example. For example, the data transiting through the input communication means MCOME can comprise the pictures of the source video data sent to the spatial filtering means MFIL1 and configuration parameters for the filtering means, provided to the microprocessor µP. The data transmitted via the input communication means MCOMS can comprise for example the processing metadata generated by the microprocessor µP as well as the spatially and temporally subsampled pictures.

The invention claimed is:

1. A method for encoding pictures of a video sequence, each of the pictures including elements organized into rows and columns, the method comprising:
obtaining an initial configuration representative of structural characteristics of a display device;
determining a first set of at least two different subsampling factor values as a function of said initial configuration representative of said structural characteristics of said display device;
and, for at least one of the pictures of a subsequence of one or more of the pictures of the video sequence:
carrying out a first spatial subsampling of at least part of the elements of the picture using a filter oriented in a first direction and comprising the first set of at least two different subsampling factor values, then inserting a resulting subsampled picture into an output subsequence, and
encoding the pictures of the output subsequence.

2. The method according to claim 1, wherein the first spatial subsampling is followed by a second spatial subsampling of at least part of the elements of the subsampled picture using a filter oriented in a second direction and comprising a second set of at least two different subsampling factor values, the second set of values being determined as a function of said initial configuration.

3. The method according to claim 1, wherein the first spatial subsampling is carried out using filters oriented in one of the following directions:
horizontal,
vertical.

4. The method according to claim 1, wherein each of the subsampling factor values of the first set of values is applied respectively to at least one group of p successive said elements in the first direction, p being a positive integer.

5. The method according to claim 1, further comprising:
analyzing content of at least one of the pictures of said input subsequence, and
updating the subsampling factor values prior to performing the first spatial subsampling, as a function of the result of the analysis of the content.

6. The method according to claim 1, further comprising:
analyzing measurements representative of movements made by a user, the display device being a head-mounted display worn by said user, and
updating the subsampling factor values prior to performing the first spatial subsampling, as a function of the result of the analysis of the measurements.

7. The method according to claim 1, further comprising:
analyzing the visual quality of the pictures of said output subsequence, and
updating the sub-sampling factor values prior to performing the first spatial subsampling, if the visual quality is lower than a predetermined threshold.

8. The method according to claim 1, further comprising, after obtaining the initial configuration:
obtaining initial sub-sequences from said video sequence, and for at least one of the initial sub-sequences:
determining information representative of content of at least one of the pictures of the initial subsequence, and as a function of said information,
determining for the initial subsequence, a processing frequency, lower than or equal to an initial picture display frequency, as a function of the determined information, and
inserting, as a function of the determined processing frequency, all or part of the pictures of the group of pictures in a subsequence of the pictures forming the input subsequence.

9. The method according to claim 8, further comprising, after inserting all or part of the pictures of the group of pictures in the subsequence, for the M pictures of the output subsequence, M being an integer, comparing a processing frequency associated with the pictures of the output subsequence with the initial picture display frequency, and
if the processing frequency is lower than the initial frequency, spatially dividing each of the M pictures of the output subsequence into N subpictures, N being an integer whose value depends on a ratio between the processing frequency and the initial frequency, the encoding of the pictures of the output subsequence corresponding to the encoding of the M*N subpictures of the output subsequence, otherwise the encoding of the pictures of the output subsequence corresponds to the encoding of said M pictures of the output subsequence.

10. The method according to claim 9, further comprising, for each output subsequence:
obtaining information representative of at least one of:
the subsampling factor values,
measurements representative of movements made by a user, the display device being a head-mounted display worn by said user,
the structural characteristics of the display device,
the processing frequency, and
encoding of said information.

11. A method for decoding data corresponding to pictures of a video sequence, each of the pictures being formed of elements organized into rows and columns, the pictures of the video sequence being grouped into output subsequences of one or more of the pictures, the method comprising:
obtaining an initial configuration representative of structural characteristics of a display device;
determining a first set of at least two different oversampling factor values as a function of said initial configuration representative of said structural characteristics of said display device;
and, for at least one picture of one of the output subsequences:
carrying out a first spatial oversampling of at least part of the elements of the picture using a filter oriented in a first direction and comprising the first set of at least two different oversampling factor values, then inserting a resulting oversampled picture into a subsequence to be decoded, and
decoding the pictures of the subsequence to be decoded.

12. The method according to claim 11, wherein the first spatial oversampling is followed by a second spatial oversampling of at least part of the elements of the oversampled picture using a filter oriented in a second direction and comprising a second set of at least two different oversampling factor values, the second set of values being determined as a function of said initial configuration.

13. A device for encoding pictures of a video sequence, each of the pictures being formed of elements organized into rows and columns, the device being configured to implement a method comprising:
obtaining an initial configuration representative of structural characteristics of a display device;
determining a first set of at least two different subsampling factor values as a function of said initial configuration representative of said structural characteristics of said display device;
and, for at least one of the pictures of an input sub-sequence, where the input sub-sequence is a sub-sequence of one or more of the pictures of the video sequence:
carrying out a first spatial subsampling of at least part of the elements of the picture using a filter oriented in a first direction and comprising the first set of at least two different subsampling factor values, then inserting a resulting subsampled picture into an output subsequence, and
encoding the pictures of the output subsequence.

14. A device for decoding data corresponding to pictures of a video sequence, each of the pictures being formed of elements organized into rows and columns, the pictures of the video sequence being grouped into output subsequences of one or more of the pictures, the device being configured to implement a method comprising:
obtaining an initial configuration representative of structural characteristics of a display device
determining a first set of at least two different oversampling factor values as a function of said initial configuration representative of said structural characteristics of said display device;
and for at least one picture of at least one of the output subsequences:
carrying out a first spatial oversampling of at least part of the elements of the picture using a filter oriented in a first direction and comprising the first set of at least two different oversampling factor values, then inserting a resulting oversampled picture into a subsequence to be decoded, and
decoding pictures of the subsequence to be decoded.

15. The method according to claim 2, wherein the second spatial subsampling is carried out using filters oriented in one of the following directions:
horizontal,
vertical.

16. The method according to claim 2, wherein each of the subsampling factor values of the first set of values is applied respectively to at least one group of p successive said elements in the first direction, each of the subsampling factor values of the second set of values is applied respectively to the at least one group of p successive said elements in the second direction, p being a positive integer.

17. The method according to claim 2, further comprising:
analyzing content of at least one of the pictures of said input subsequence, and
updating the subsampling factor values prior to performing the first spatial subsampling, as a function of the result of the analysis of the content.

18. The method according to claim 3, further comprising:
analyzing content of at least one of the pictures of said input subsequence, and
updating the subsampling factor values prior to performing the first spatial subsampling, as a function of the result of the analysis of the content.

19. The method according to claim 4, further comprising:
analyzing content of at least one of the pictures of said input subsequence, and
updating the subsampling factor values prior to performing the first spatial subsampling, as a function of the result of the analysis of the content.

20. The method according to claim 2, further comprising:
analyzing measurements representative of movements made by a user, the display device being a head-mounted display worn by said user, and
updating the subsampling factor values prior to performing the first spatial subsampling, as a function of the result of the analysis of the measurements.

* * * * *